March 28, 1950 C. E. WEAVER 2,501,883
ELECTRONIC FREQUENCY CONTROL FOR RADIO RECEIVERS
Filed Aug. 21, 1945
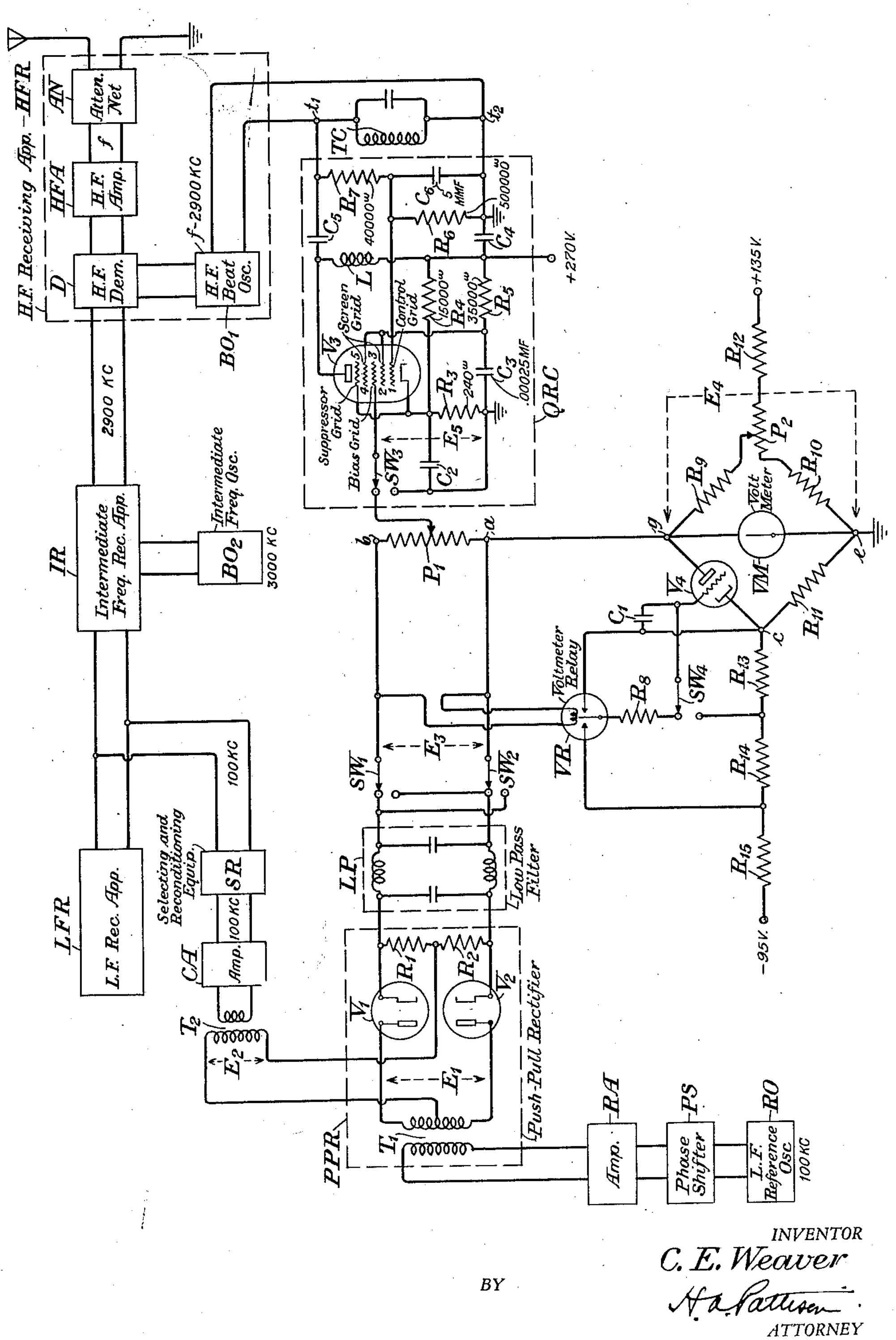
INVENTOR
C. E. Weaver
BY
H. A. Patterson
ATTORNEY Patented Mar. 28, 1950

2,501,883

UNITED STATES PATENT OFFICE 2,501,883

ELECTRONIC FREQUENCY CONTROL FOR RADIO RECEIVERS

Charles Earl Weaver, Inverness, Calif., assignor to American Telephone and Telegraph Company, a corporation of New York Application August 21, 1945, Serial No. 611,713

9 Claims. (Cl. 250—20)

This invention relates to radio receivers and more particularly to arrangements for controlling the frequency of locally supplied carrier waves for such receivers.

In radio receivers adapted for the reception of very high frequencies it is customary to supply a beating frequency locally, because the carrier transmitted from the distant transmitting station may be received poorly, or in some instances not received at all, due to selective fading. In such cases it is necessary to provide some arrangements for keeping the locally supplied beating frequency in proper frequency relationship with the carrier sent from the distant station. If the locally supplied wave departs materially from its proper frequency relationship to the carrier on which the received side band is modulated, distortion results.

Heretofore it has been the practice to bring about a condition approximating the proper frequency relationship between the received carrier and locally supplied beating frequency, by applying to a modulator a locally generated control wave together with a wave of substantially the same frequency derived from the received carrier. Preferably the modulator employed for this purpose is of the push-pull type, and produces a direct current potential whose magnitude and polarity are determined by the vector sum or difference of the two applied waves. The resultant direct current is then applied to a motor which adjusts a capacity or other frequency determining element of the oscillator supplying the local high frequency carrier. This arrangement tends to prevent the locally generated beating frequency from getting very far away from its proper frequency relationship to the received carrier.

Such arrangements have inherent difficulties due to inertia and friction of moving parts. Moreover, they are subject to a serious defect in that they are sometimes unable to resume control after a prolonged deep fade of the received carrier.

It has also been proposed to use an electronic control arrangement instead of a motor for controlling the frequency of the local oscillator, because it is free from certain difficulties arising from the mechanical inertia and friction of moving parts inherent in the motor type of control. Electronic arrangements hitherto proposed, however, have been subject to some extent to one of the disadvantages of the motor control type, namely, failure to resume control after the incoming carrier has faded out completely for a short period of time. Moreover, such electronic control arrangements are unable to maintain the beating oscillator at the frequency to which it was adjusted before the deep fade occurred. The oscillator in such cases tends to slip back to a normal frequency adjustment which may be quite different from the proper relationship to the received carrier.

It is therefore the purpose of the present invention to provide an electronic type of frequency control which will avoid these difficulties, and will not only resume control when a deep carrier fade ceases, but will keep the local oscillator adjusted to generate a wave having substantially the same frequency relationship to the received carrier as existed before the fade commenced. This is preferably accomplished by means of a quadrature reactance tube bridged across the tuning circuit of the local oscillator, the effective reactance of said tube being jointly controlled by the direct current potential in the output of the push-pull modulator, and the charge of a condenser which is increased or decreased with changes in the frequency adjustment of the oscillator. In such case, if the carrier fades so that no direct current potential is supplied by the push-pull modulator, the charged condenser tends to maintain the reactance of the quadrature reactance tube, and hence the oscillator, at substantially the adjustment previously existing.

The invention will be more fully understood from the following detailed description thereof when read in connection with the appended drawing, the single figure of which shows a preferred embodiment of the invention.

The invention is illustrated as being applied to a radio receiving circuit of the type in which the very high carrier frequency and associated side bands received from the distant transmitter are stepped down in frequency by successive stages until the ultimate signal is finally demodulated. This involves supplying appropriate beating frequencies at points in the receiver, these beating frequencies being generated by local oscillators. In order to illustrate the frequency relationship involved, certain specific frequencies have been applied to particular pieces of apparatus in the illustrated circuit arrangement, but it will be understood that these frequencies are merely illustrative and may be varied to any desired degree.

Referring to the drawing, in which the parts are generally shown symbolically, the receiving antenna is connected through an attenuation network AN of known type to a high frequency amplifier HFA. Assuming that the received waves include a high frequency carrier *f* and associated side bands, these waves are amplified by the amplifier HFA and applied to a demodulator D which serves to step the received frequencies down in the frequency spectrum to an intermediate stage. Assuming that the intermediate stage corresponds to a carrier frequency of 2900 kc., the demodulator is supplied by a high frequency beating oscillator $BO_1$ with a carrier frequency of approximately *f*—2900 kc. This beats with received carrier *f* to produce the intermediate carrier of 2900 kc.

The stepped-down carrier frequency of 2900 kc., together with the associated side bands, is applied to an intermediate frequency receiving apparatus IR indicated symbolically. In order to step down the intermediate carrier and side bands to a range corresponding to a carrier of approximately 100 kc., an intermediate frequency oscillator $BO_2$ is connected to the receiver IR to supply a beating frequency which differs from the intermediate carrier of 2900 kc. by about 100 kc. In the instance illustrated, this beating frequency is 3000 kc. The resultant carrier of approximately 100 kc. with its associated side bands will appear upon the output side of the intermediate frequency receiving apparatus IR, and may be applied to a final low frequency receiving apparatus, symbolically illustrated at LFR, which serves to detect the signals corresponding to the side bands from the final carrier.

A receiving system such as that so far described and symbolically shown herein, is illustrated and described in somewhat greater detail in my prior application, Serial No. 548,822, filed August 10, 1944, now Patent No. 2,379,052, issued June 26, 1945.

In order to keep the beating frequency supplied by the beating oscillator $BO_1$ in proper relationship to the received carrier, an electronic frequency control arrangement is provided. This control arrangement includes a push-pull rectifier PPR and a quadrature reactance tube circuit QRC. The push-pull rectifier PPR serves to combine a frequency component corresponding to about 100 kc., derived from the received carrier, with a similar component supplied by a local reference oscillator RO. The resultant direct current voltage (if any) is used to control the value of the quadrature reactance circuit QRC in a manner which will appear later.

The reference frequency of 100 kc., supplied by the oscillator RO, is connected through a phase shifter PS to an amplifier RA and applied to the input circuit of the push-pull rectifier PPR through a transformer $T_1$. The transformer is associated with the rectifying tubes $V_1$ and $V_2$ in such a manner that the voltage $E_1$ corresponding to the wave supplied by the reference oscillator RO is connected in series relationship to the plates of the two tubes. Consequently, if only the wave supplied by the reference oscillator RO is applied to the push-pull rectifier PPR any direct current component resulting from rectification and corresponding to the wave supplied by the reference oscillator RO will be balanced out. Under these circumstances no D. C. voltage will appear at the terminals of the resistances $R_1$ and $R_2$.

The 100 kc. carrier component derived from the received carrier *f* is picked off from the output of the intermediate frequency receiver IR. It is then passed through selecting and reconditioning equipment SR and through a suitabe amplifier CA to a transformer $T_2$ which is connected in a common branch of the circuit of the tubes $V_1$ and $V_2$. Consequently, the voltage $E_2$ corresponding to the 100 kc. frequency appearing in the output of the amplifier CA is applied to the push-pull rectifier PPR in such relationship that the impedances of the tubes $V_1$ and $V_2$ are connected in parallel with respect to the voltage $E_2$.

When carrier waves are applied through both transformers $T_1$ and $T_2$ a D. C. voltage $E_3$ appears across the terminals 1 and 2 of the resistances $R_1$ and $R_2$. The magnitude and polarity of this voltage is determined by te vector sum or difference of the voltages $E_1$ and $E_2$ of the two carriers. Any A. C. voltages resulting from the rectifying action of the tubes may be eliminated by means of a low-pass filter LP, which passes only the direct current component and suppresses the alternating current components. The filter LP, in addition to eliminating alternating current components which are of no use in this part of the circuit, while allowing slow variations in the voltage $E_3$ to be passed, also introduces a slight delay in the application of variations of $E_3$ to the potentiometer $P_1$. The presence of this delay serves to prevent a hunting condition from arising in the frequency control, which might arise if the delay inherent in the circuits IR, SR, CA, $T_2$ and $T_1$ (between the controlled oscillator and the point of phase comparison) were greater than the delay in the circuits LP and QRC (between the point of phase comparison and the controlled oscillator).

With the arrangement above described it is evident that if only the voltage $E_1$ is applied to the rectifier, no D. C. component corresponding to $E_3$ will appear in the output of the rectifier. Also, if the two carrier currents are of the same frequency and in proper phase relation no D. C. component corresponding to $E_3$ will appear. If, however, the two carrier components $E_1$ and $E_2$ applied to the rectifier are not identical in frequency and properly phased, a direct current voltage $E_3$ appears in the output whose magnitude and polarity is determined by the vector sum or difference of the two carriers. This D. C. component is used, as will be described later, to control the reactance of the beating oscillator $BO_1$.

The quadrature reactance circuit QRC includes a multi-element vacuum tube $V_3$. The grid 1 of this tube is the control grid and is connected to the oscillating circuit of the oscillator $BO_1$, as will be described in more detail later. This control grid serves to vary the plate current of the tube in accordance with the frequency of the oscillator $BO_1$. The grid 3 is a bias grid and is connected to the slide wire of potentiometer $P_1$. At the terminals *a* and *b* of potentiometer $P_1$ the voltage $E_3$ is applied. The biasing voltage applied to the grid 3 will therefore include a voltage which is a function of the direct current voltage $E_3$ appearing in the output circuit of the push-pull rectifier PPR. The grids 2 and 4 are connected together and serve to screen the grid 3 in a manner well understood in the art. The grid 5 is a suppressor grid which serves to suppress secondary emission from the plate.

The plate of the tube $V_3$ is supplied with a positive voltage of 270 volts through an inductance L which serves to suppress the A. C. component appearing in the plate circuit from the direct current supply connection. A filter including capacities $C_2$ and $C_3$ and resistances $R_4$ and $R_5$ acts as a decoupling filter to keep any A. C. components which may be superposed on the 270 volt direct current source from affecting the tube $V_3$. A resistance $R_3$ is connected in a branch common to the cathode-bias grid circuit and the cathode-plate circuit. This combination serves to apply to the grid 3 a normal biasing potential derived from the plate circuit source in a manner well understood in the art. The condenser $C_2$ is connected across the resistance $R_3$ to shunt out any A. C. variations which may be applied to said resistance from the 270 volt source.

The reactance controlling elements of the circuit include a resistance $R_7$ and a capacity $C_6$. These are connected across the conductors leading from the plate and cathode to the terminals $t_1$ and $t_2$, respectively, of a tuning coil TC in the oscillator circuit $BO_1$. It will thus be seen that the resistance $R_7$ and capacity $C_6$ are connected in parallel with the cathode-plate circuit of the tube $V_3$ across the terminals $t_1$ and $t_2$ of the oscillating circuit of the beating oscillator $BO_1$. The values of resistance $R_7$ and capacity $C_6$ are so chosen that the resistance of $R_7$ is much greater than the reactance of the capacity $C_6$. Consequently, this combination has approximately unity power factor. In other words, the reactive effect of the capacity $C_6$ across the terminals of the coil TC is so small that the impedance of the combination is substantially a pure resistance. The result is that the A. C. current from the oscillator $BO_1$ passing through $R_7$ and $C_6$ is substantially in phase with the oscillator voltage.

Although the current through the condenser $C_6$ is nearly in phase with the oscillator voltage across the coil TC, the voltage drop across the condenser $C_6$ lags the current through said condenser by 90°. Hence the voltage drop across said condenser lags the oscillator coil voltage (which is substantially in phase with the current through said coil) by approximately 90°. This voltage across the condenser $C_6$ is applied to the control grid 1 of the tube $V_3$. Current will therefore flow in the plate circuit of tube $V_3$ in phase with the voltage applied to the grid 1 so that peak plate current will correspond to peak grid voltage. This means that the alternating component of the plate current of the tube $V_3$ will lag the voltage across the tuning coil TC of the oscillatory circuit of the oscillator $BO_1$ by approximately 90° thus making the effective plate impedance of the tube $V_3$ act as an imaginary inductance in parallel with the coil TC. The value of this inductance will vary with the biasing potential applied to the grid 3.

Condensers $C_4$ and $C_5$ serve to isolate the direct current supplied to the plate of the tube $V_3$ from the oscillating circuit of the oscillator $BO_1$. The resistance $R_6$ is shunted about the condenser $C_6$ and serves to apply a normal D. C. bias to the control grid 1.

With this arrangement it will be evident that the frequency generated by the oscillator $BO_1$ will vary with the variable reactance applied across the terminals $t_1$ and $t_2$ by the tube $V_3$. The value of this reactance will, of course, vary with the bias applied to the grid 3. Consequently, when the wave of approximately 100 kc. from the intermediate frequency receiver IR and the wave supplied by the local oscillator RO begin to drift out of phase with respect to each other, a voltage $E_3$ is applied by the push-pull rectifier PPR to the terminals of the potentiometer $P_1$. The value of this voltage depends upon the vector sum or difference of the two carrier components. Its value increases with increasing phase difference between the carriers, and its direction may be either positive or negative depending upon the relative phases of the two carriers.

A portion of the direct current voltage thus applied to the potentiometer $P_1$ is applied to the biasing grid 3 of the tube $V_3$ and produces a corresponding change in the output impedance of said tube. This changes the reactance connected across the terminals $t_1$ and $t_2$ so as to produce a change in the frequency of the oscillator $BO_1$, tending to increase or decrease, as the case may be, the intermediate frequency of approximately 2900 kc. appearing in the output circuit of the high frequency demodulator D. Assuming the frequency of 3000 kc. supplied by oscillator $BO_2$ is fixed, this causes a corresponding increase or decrease in the derived carrier frequency of approximately 100 kc. picked off from the output of the intermediate receiver IR, thus tending to bring this component back into phase with the carrier wave supplied by the oscillator RO.

As the two carrier components approach proper phase relationship the voltage $E_3$ decreases and this tends to bring the frequency of the oscillator $BO_1$ back to its previous value. However, the arrangement does not wholly restore the two carrier components applied to the push-pull rectifier PPR to their proper phase relationship, as that would result in reducing the voltage $E_3$ to zero, thus eliminating the biasing potential which tended to bring the two carrier components into phase. The circuit merely tends to prevent the two carrier components from drifting farther apart in phase. If, therefore, the received carrier $f$ and the reference frequency supplied by the oscillator RO tend to drift out of their proper relationship this tendency is opposed by the action of the push-pull rectifier and the reactance circuit QRC.

This arrangement, of course, reduces the difficulties due to the mechanical inertia and friction of the moving parts of a motor because its action is wholly electronic. However, if a porlonged deep fade of the receiver carrier $f$ occurs when the two waves applied to the push-pull rectifier PPR are drifting out of phase with each other, the arrangement so far described may be unable to take control, after the fade ends, to reduce the difference in phase between the two waves. This is because the component derived from the carrier $f$ has faded out and only the component supplied by the reference frequency oscillator RO is present. When only this component is present, no direct current component appears in the output of the push-pull rectifier PPR and, consequently, the voltage $E_3$ is reduced to zero. The reactance supplied by the tube $V_3$ at once returns to its normal value. By the time the carrier $f$ again returns, it may be so far out of its normal frequency relationship to the reference frequency supplied by the oscillator RO, that the reactance tube $V_3$ will be unable to bring the two components applied to the push-pull rectifier back toward normal phase relationship.

In order to overcome this difficulty an arrangement including a voltmeter relay, a condenser, and a bridge controlled thereby is provided. The arrangement is such that when the relay operates the condenser may be charged or discharged (depending upon the direction of the voltage $E_3$) and the change in the charge of the condenser unbalances the bridge. The resultant unbalanced voltage across the terminals of the bridge is used in connection with the voltage $E_3$ to bias the grid 3 of the reactance tube. Under these conditions if the voltage $E_3$ disappears, due to fading of the received carrier, the unbalanced voltage supplied by the bridge will maintain the grid of the reactance tube biased to an extent not greatly different from the biasing condition that previously existed. This holds the wave generated by the beating oscillator $BO_1$ at substantially its adjusted frequency until the carrier which has faded is again received in sufficient strength to be effective.

The apparatus for accomplishing these results includes a voltmeter relay VR bridged across the terminals *a* and *b* of the output circuit of the push-pull rectifier PPR so that the voltmeter may be operated by current due to the potential $E_3$. The armature of the voltmeter relay is connected through a resistance $R_8$ to the grid of a vacuum tube $V_4$ and to one terminal of a condenser $C_1$ whose other terminal is connected to point *c* of the bridge. One arm of the bridge is formed by the plate impedance of the tube $V_4$. The other arms of the bridge include the resistances $R_9$, $R_{10}$ and $R_{11}$. A part of the potentiometer $P_2$ is included in the arm containing the resistance $R_{10}$ so that the potentiometer $P_2$ may be used to balance the bridge. A positive potential of 135 volts is connected through a resistance $R_{12}$ to point *d* of the bridge which is in potentiometer $P_2$. Similarly, a negative potential of 95 volts is applied through resistance $R_{15}$ and through other separate elements to point *c* of the bridge. The 135 volt source serves to supply the plate current for the tube $V_4$, and under proper conditions the 95 volt source may furnish the biasing potential for the grid of the tube $V_4$. Resistances $R_{13}$ and $R_{14}$ are connected, respectively, to the right and left contacts of the voltmeter relay VR, as shown.

In setting up the bridge for operation it should first be balanced with a normal biasing potential on the grid of the tube $V_4$. To accomplish this the switch $SW_4$ should be thrown to its lower position so that a biasing potential is supplied from the 95 volt negative source through resistances $R_{15}$ and $R_{14}$ and over switch $SW_4$ to the grid of the tube $V_4$. At the same time a charging circuit for the condenser $C_1$ will be established from the 95 volt source through resistances $R_{15}$ and $R_{14}$, thence over switch $SW_4$ through the condenser $C_1$ to point *c*, and then to ground through resistance $R_{11}$ of the bridge. The grid of the tube $V_4$ is thus set at a normal biasing potential and the condenser $C_1$ is charged to that potential. The bridge is then balanced by shifting the slide wire of the potentiometer $P_2$ so that no difference in potential exists between points *e* and *g* of the bridge as indicated by the voltmeter VM. The switch $SW_4$ is then moved back to its upper position so that the charge on the condenser $C_1$ and the potential on the grid of the tube $V_4$ will thereafter be controlled by the armature of the voltmeter of relay VR as will appear later.

At the same time that the bridge is being balanced the switch $SW_3$ in the biasing circuit of the reactance tube $V_3$ may be thrown to its lower position, thus isolating the reactance tube and circuits controlled thereby from any effects produced by the potentials in the potentiometer $P_1$. Under this condition the biasing grid 3 of the reactance tube $V_3$ is connected directly to ground and the tube $V_3$ will, in effect, bridge a certain normal reactance across the terminals of the coil TC in the oscillating circuit of the high frequency beating oscillator $BO_1$. The oscillator $BO_1$ may now have its frequency adjusted by any method well known in the art, such as adjusting a tuning condenser, until a proper signal is received by the low frequency receiver LFR from the distant sending station. When the station has thus been tuned in, the switch $SW_3$ may be thrown to its upper position. The apparatus is now in proper operating condition.

When the circuit has been thus adjusted it operates initially just as has been previously described, because no unbalanced potential from the bridge is applied to the grid 3 of the tube $V_3$. A difference in phase between the waves supplied to the push-pull rectifier $T_1$ produces a change in bias on the grid of the reactance tube $V_3$. This changes the frequency of the beating oscillator $BO_1$, tending to bring the derived frequency of approximately 100 kc., applied through the transformer $T_2$ of the push-pull rectifier $T_1$, into phase with the locally supplied wave from the reference oscillator RO.

The voltmeter relay VR and the potentiometer $P_1$ are so designed and adjusted that the voltmeter relay does not operate until the voltage $E_5$, acting upon the grid 3 of the reactance tube $V_3$, changes sufficiently to cause a frequency change in the oscillator $BO_1$ in excess of approximately plus or minus 10 cycles. With the bridge balanced the potential $E_5$ is a function solely of the potential $E_3$. If the beating oscillator has had its frequency adjusted up or down more than 10 cycles, the potential $E_3$ will be great enough to cause a current to flow through the winding of the voltmeter relay VR. This current will be sufficient in strength to shift the armature of the voltmeter relay to one or the other of its contacts depending upon the direction of the voltage $E_3$.

If the voltage $E_3$ is in such a direction that the armature of the voltmeter relay VR shifts to its left-hand contact, a charging circuit is completed from the 95 volt negative source through the resistance $R_{15}$, over the left-hand contact of the voltmeter relay VR, through resistance $R_8$, over switch $SW_4$, through the condenser $C_1$, and thence to ground through the resistance $R_{11}$ of the bridge. As the condenser $C_1$ is gradually charged the bias potential on the grid of the tube $V_4$ is increased and the bridge becomes more and more unbalanced as the grid potential rises. This produces a voltage $E_4$ between the points *e* and *g* of the bridge, and this voltage is added to the drop through the lower part of the potentiometer $P_1$ due to the potential $E_3$, thus determining the bias applied to the grid 3 of the reactance tube $V_3$.

As the unbalanced potential $E_4$ of the bridge increases during the charge of the condenser $C_1$, the biasing potential of the reactance tube $V_3$ is changed correspondingly. This produces a gradual change in the reactance controlling the beating oscillator $BO_1$. This tends to bring the approximately 100 kc. frequency applied to the transformer $T_2$ of the push-pull rectifier PPR into synchronism with the wave supplied by the reference oscillator RO. This change tends to reduce the potential $E_3$. As the unbalanced potential $E_4$ of the bridge increases the voltage $E_3$ decreases until the voltmeter relay is released and its armature restored to its mid-position.

It will be noted that the unbalanced voltage $E_4$ does not affect the current flowing through the voltmeter relay. This is because no current flows in the potentiometer $P_1$ due to the potential $E_4$, since no current can flow to the grid 3 of the tube $V_3$. As no current flow results from the voltage $E_4$ there is no potential drop through the potentiometer $P_1$ due to the voltage $E_4$ which can affect the voltmeter relay. The voltmeter relay therefore is solely under the control of the potential $E_3$ and its armature falls off when that potential is reduced sufficiently in value.

When the voltmeter relay releases, as above described, the charging circuit for the condenser $C_1$ is opened. However, the condenser remains charged to a value determined by the time required to reduce the potential $E_3$ to a sufficiently low value to release the voltmeter relay. The potential of the grid of the tube $V_4$ is now determined by the charge on the condenser $C_1$, which has a high leakage resistance so that the potential of the grid does not materially fall off during a period of considerable length. Tests have indicated that a negligible voltage variation will occur due to the leakage of the condenser $C_1$ over a period of 30 seconds or more. Hence, for at least this period, the unbalanced potential $E_4$ of the bridge will continue to be applied to the terminal *a* of the potentiometer $P_1$.

The potential $E_4$ is thus applied to the grid 3 of the reactance tube $V_3$, and upon this potential the drop through the potentiometer $P_1$, due to the voltage $E_3$, is superposed and applied to the grid 3. The potential $E_4$ now remains substantially constant until the voltmeter relay VR is again operated. In the meantime, as the two waves applied to the push-pull rectifier tend to change their phase relationship, the voltage $E_3$ may increase or decrease or even be changed in direction. Any change in the value or direction of the potential $E_3$ will produce a corresponding change in the potential applied to the bias grid 3 of the reactance tube $V_3$. This will change the frequency of the oscillator $BO_1$ and tend to bring the two components applied to the push-pull rectifier PPR into phase.

If the received carrier should fade out so that the approximately 100 kc. wave is no longer applied to the transformer $T_2$ of the push-pull rectifier PPR, the potential $E_3$ will become zero. This is because the rectified half waves of the current supplied by the oscillator RO tend to oppose each other in the output of the push-pull rectifier PPR. When the potential $E_3$ drops to zero, in the manner just described, the reactance of the quadrature reactance circuit QRC will not fall back to its normal value but will be held at a value determined by the unbalanced potential $E_4$ of the bridge. Thus the wave generated by oscillator $BO_1$ will be held substantially at the frequency existing just before the received carrier faded out. This enables the frequency determining apparatus to take control when the carrier frequency is again received, because the reactance circuit will not be too far out of adjustment after a short fade of the received carrier.

With the oscillator $BO_1$ held to a frequency determined by the unbalanced potential $E_4$ of the bridge in the manner just described, the received side bands (which usually continue to be received even though the carrier has faded out) will beat with the frequency generated by the oscillator $BO_1$. This steps the side bands to an intermediate frequency range, and after being further stepped down by apparatus IR, they will produce signals in the low frequency receiving apparatus LFR. While under these conditions the oscillator $BO_1$ may be adjusted to a frequency that is not quite properly related to the received side band frequencies, the resultant distortion will not be nearly as great as though the oscillator $BO_1$ had been reset to generate waves of normal frequency when the carrier faded. On the contrary, due to the adjustment of the reactance tube produced by the potential $E_4$, the signal may be received without intolerable distortion even during a deep fade of the received carrier.

Returning to the condition where the bridge is balanced so that no potential $E_4$ exists, let us suppose that the potential $E_3$ attains a value sufficient to operate the voltmeter relay VR, and its direction is such that the voltmeter will shift its armature to its right-hand contact. The condenser $C_1$ will under these conditions gradually discharge through the resistance $R_8$, and the biasing potential on the grid of the tube $V_4$ will be gradually reduced. This causes an increasing unbalance of the bridge, producing an increasing potential $E_4$ in the opposite direction. The potential on the biasing grid 3 of the reactance tube $V_3$ is accordingly reduced, and the consequent adjustment in the frequency of the oscillator $BO_1$ tends to reduce the value of the potential $E_3$. When this potential has fallen sufficiently, the voltmeter relay VR will release and restore its armature to its mid-position. The potential on the grid of the tube $V_4$ will now remain at the reduced potential of the charge on the condenser $C_1$, and the unbalanced potential $E_4$ will be added to the component of the potential $E_3$ to produce a potential $E_5$ biasing the grid 3 of the reactance tube $V_3$ at a lower value.

It will then be seen that the potential $E_3$ will rise and fall or even change direction as the two wave components applied to the push-pull rectifier PPR change in phase with respect to each other, and under the control of voltages $V_3$ and $V_4$ the reactance of the tube $V_3$ will be adjusted accordingly. The wave generated by the oscillator $BO_1$ will, consequently, be shifted in frequency with consequent change in the phase of the wave applied to the transformer $T_2$, thus tending to bring the two waves applied to the push-pull rectifier PPR closer into phase.

If under these conditions a deep fade of the received carrier should occur, the potential $E_3$ will become zero as before, and the reactance of the tube $V_3$ will be determined by the newly adjusted value of the unbalanced potential $E_4$ of the bridge. The frequency of the wave generated by the oscillator $BO_1$ will therefore not be shifted back to its normal value, but will remain fairly near the frequency generated before the fade occurred. This enables the frequency determining apparatus to take control when the carrier from the distant station is again received.

It will be clear that the unbalanced voltage $E_4$ will be changed in value each time the voltmeter relay VR operates. This will produce a corresponding change in the fundamental baising potential applied to the grid 3 of the reactance tube $V_3$ independently of the voltage $E_3$ in the output of the push-pull rectifier PPR. As the voltmeter relay VR operates, from time to time, potential $E_4$ may be increased or decreased. If, when the potential $E_4$ in in a given direction successive decreases occur, the unbalanced potential $E_4$ may pass through zero and be set at some value in the opposite direction after a particular operation of the voltmeter relay VR. Thereafter the potential $E_4$ may be either increased in the opposite direction or decreased and shifted to its former direction, depending upon the adjusted charges existing from time to time upon the condenser $C_1$.

If in the normal operation of the circuit the two waves supplied to the push-pull rectifier PPR should remain substantially in proper phase for a sufficiently long time so that no operation of the voltmeter relay VR occurs until the charge on condenser $C_1$ is reduced, due to leakage, the unbalance of the bridge will be changed due to such leakage. Consequently, the potential $E_4$ will gradually change in value, and a consequent change of the potential applied to the grid 3 of the reactance tube $V_3$ will occur. When this change is sufficient to produce a variation of more than 10 cycles in the frequency of the beating oscillator $BO_1$, the potential $E_3$ will be increased by a sufficient amount to operate the voltmeter relay VR to again adjust the charge on the condenser $C_1$.

To recapitulate, the effect of the voltmeter VR and the bridge circuit is to adjust the basic bias upon the grid 3 of the reactance tube $V_3$ from time to time, whenever a change of more than 10 cycles occurs in the frequency generated by the oscillator $BO_1$. Therefore, if a sudden deep fade of the received carrier should occur, so that the voltage $E_3$ becomes zero, the reactance circuit will remain at approximately the adjustment determined by the previous setting of the voltage $E_4$. The result is that the wave then generated by the oscillator $BO_1$ will generally be not more than 10 cycles out of line with the frequency to which it was adjusted before the carrier fade occurred. Resultant signal distortion is thus kept within reasonable limits during a deep carrier fade.

While this invention has been disclosed in certain specific arrangements which are deemed desirable, it will be obvious that the general principles herein set forth may be embodied in many other organizations, widely different from those illustrated, without departing from the spirit of the invention as defined in the appended claims.

What is claimed is:

1. A radio system including receiving means to receive a carrier and associated side bands transmitted from a distant station, an oscillator to produce a locally generated wave to beat with received frequencies, apparatus to maintain said locally generated wave in a desired frequency relationship with respect to the received carrier, said apparatus including means to combine a wave derived from the received carrier with a locally generated reference wave to produce a controlling voltage whose magnitude and polarity are determined by the vector sum or difference of the combined waves, a reactance tube connected to control the frequency generated by said oscillator, a biasing grid to control the value of the reactance of said tube, means to apply to said grid a biasing voltage derived from said controlling voltage, a condenser and means for changing the charge of said condenser whenever said controlling voltage exceeds a predetermined magnitude and to apply to said grid another biasing voltage determined by the charge on said condenser, said condenser being so connected in circuit with said last-mentioned means that a charge is maintained thereon with low leakage except when it is being changed by said last-mentioned means, both of said means for applying biasing voltage to said grid being arranged relative to each other so that the algebraic sum of said voltages is applied to said grid, whereby the reactance of said tube will be determined by the combined effect of said biasing voltages, and the frequency of said oscillator will be adjusted accordingly.

2. A radio system including receiving means to receive a carrier and associated side bands transmitted from a distant station, an oscillator to produce a locally generated wave to beat with received frequencies, apparatus to maintain said locally generated wave in a desired frequency relationship with respect to the received carrier, said apparatus including means to combine a wave derived from the received carrier with a locally generated reference wave to produce a controlling voltage whose magnitude and polarity are determined by the vector sum or difference of the combined waves, a reactance tube connected to control the frequency generated by said oscillator, a biasing grid to control the value of the reactance of said tube, means to apply to said grid a biasing voltage derived from said controlling voltage, a condenser adapted to have a charge applied thereto, means to prevent rapid discharge of said condenser, a relay responsive to changes in the direction and value of said controlling voltage to increase or decrease the charge on said condenser accordingly, and means to apply to said grid a biasing voltage determined by the charge of said condenser, whereby the reactance of said tube will be determined by the combined effect of said biasing voltages, and the frequency of said oscillator will be adjusted accordingly.

3. A radio system including receiving means to receive a carrier and associated side bands transmitted from a distant station, an oscillator to produce a locally generated wave to beat with received frequencies, apparatus to maintain said locally generated wave in a desired frequency relationship with respect to the received carrier, said apparatus including means to combine a wave derived from the received carrier with a locally generated reference wave to produce a controlling voltage whose magnitude and polarity are determined by the vector sum or difference of the combined waves, a reactance tube connected to control the frequency generated by said oscillator, a biasing grid to control the value of the reactance of said tube, means to apply to said grid a biasing voltage derived from said controlling voltage, a condenser adapted to have a charge applied thereto, means to prevent rapid discharge of said condenser, a relay responsive to changes in the direction and value of said controlling voltage to increase or decrease the charge on said condenser accordingly, a bridge arranged so that its degree of unbalance is determined by the charge on said condenser, means to produce a biasing voltage determined as to direction and value by the degree of unbalance of said bridge, and means to apply said last mentioned voltage to said grid, whereby the reactance of said tube will be determined by the combined effect of said biasing voltages, and the frequency of said oscillator will be adjusted accordingly.

4. A radio system including receiving means to receive a carrier and associated side bands transmitted from a distant station, an oscillator to produce a locally generated wave to beat with received frequencies, apparatus to maintain said locally generated wave in a desired frequency relationship with respect to the received carrier, said apparatus including means to combine a wave derived from the received carrier with a locally generated reference wave to produce a controlling voltage whose magnitude and polarity are determined by the vector sum or difference of the combined waves, a reactance tube connected to control the frequency generated by said oscillator, a biasing grid to control the value of the reactance of said tube, means to apply to said grid a biasing voltage derived from said controlling voltage, a condenser adapted to have a charge applied thereto, means to prevent rapid discharge of said condenser, a relay responsive to changes in the direction and value of said controlling voltage to increase or decrease the charge on said condenser accordingly, a bridge having an arm including the impedance of a vacuum tube, means to vary the impedance of said tube in accordance with the charge on said condenser and thereby change the condition of balance of said bridge, means to produce a biasing voltage determined as to direction and value by the degree of unbalance of said bridge, and means to apply said last mentioned voltage to said grid, whereby the reactance of said tube will be determined by the combined effect of said biasing voltages, and the frequency of said oscillator will be adjusted accordingly.

5. A radio system including receiving means to receive a carrier and associated side bands transmitted from a distant station, an oscillator to produce a locally generated wave to beat with received frequencies, apparatus to maintain said locally generated wave in a desired frequency relationship with respect to the received carrier, said apparatus including means to combine a wave derived from the received carrier with a locally generated reference wave to produce a controlling voltage whose magnitude and polarity are determined by the vector sum or difference of the combined waves, a reactance tube having its output impedance connected to control the frequency generated by said oscillator, a control grid for said reactance tube having its potential controlled by the oscillations of said oscillator, means to change the phase of the potential applied to said grid with respect to the said oscillations so that the output impedance of said tube will be in effect a reactance, said reactance tube having a biasing grid whose potential will determine the value of said reactance, means to apply to said biasing grid a biasing voltage derived from said controlling voltage, a condenser adapted to have a charge applied thereto, means to prevent rapid discharge of said condenser, a relay responsive to changes in the direction and value of said controlling voltage to increase or decrease the charge on said condenser accordingly, and means to apply to said grid a biasing voltage determined by the charge of said condenser, whereby the reactance of said tube will be determined by the combined effect of said biasing voltages, and the frequency of said oscillator will be adjusted accordingly.

6. A radio system including receiving means to receive a carrier and associated side bands transmitted from a distant station, an oscillator to produce a locally generated wave to beat with received frequencies, apparatus to maintain said locally generated wave in a desired frequency relationship with respect to the received carrier, said apparatus including means to combine a wave derived from the received carrier with a locally generated reference wave to produce a controlling voltage whose magnitude and polarity are determined by the vector sum or difference of the combined waves, a reactance tube having its output impedance connected to control the frequency generated by said oscillator, a control grid for said reactance tube having its potential controlled by the oscillations of said oscillator, means to change the phase of the potential applied to said grid with respect to the said oscillations so that the output impedance of said tube will be in effect a reactance, said reactance tube having a biasing grid whose potential will determine the value of said reactance, means to apply to said biasing grid a biasing voltage derived from said controlling voltage, a condenser adapted to have a charge applied thereto, means to prevent rapid discharge of said condenser, a relay responsive to changes in the direction and value of said controlling voltage to increase or decrease the charge on said condenser accordingly, a bridge arranged so that its degree of unbalance is determined by the charge on said condenser, means to produce a biasing voltage determined as to direction and value by the degree of unbalance of said bridge, and means to apply said last mentioned voltage to said grid, whereby the reactance of said tube will be determined by the combined effect of said biasing voltages, and the frequency of said oscillator will be adjusted accordingly.

7. A radio system including receiving means to receive a carrier and associated side bands transmitted from a distant station, an oscillator to produce a locally generated wave to beat with received frequencies, apparatus to maintain said locally generated wave in a desired frequency relationship with respect to the received carrier, said apparatus including means to combine a wave derived from the received carrier with a locally generated reference wave to produce a controlling voltage whose magnitude and polarity are determined by the vector sum or difference of the combined waves, a reactance tube having its output impedance connected to control the frequency generated by said oscillator, a control grid for said reactance tube having its potential controlled by the oscillations of said oscillator, means to change the phase of the potential applied to said grid with respect to the said oscillations so that the output impedance of said tube will be in effect a reactance, said reactance tube having a biasing grid whose potential will determine the value of said reactance, means to apply to said biasing grid a biasing voltage derived from said controlling voltage, a condenser adapted to have a charge applied thereto, means to prevent rapid discharge of said condenser, a relay responsive to changes in the direction and value of said controlling voltage to increase or decrease the charge on said condenser accordingly, a bridge having an arm including the impedance of a vacuum tube, means to vary the impedance of said tube in accordance with the charge on said condenser and thereby change the condition of balance of said bridge, means to produce a biasing voltage determined as to direction and value by the degree of unbalance of said bridge, and means to apply said last mentioned voltage to said grid, whereby the reactance of said tube will be determined by the combined effect of said biasing voltages, and the frequency of said oscillator will be adjusted accordingly.

8. In a radio receiver, a first oscillator to produce a locally generated wave to beat with received waves which include a received carrier wave and thereby to produce a derived carrier wave, a second oscillator to produce a locally generated reference wave, means including a balanced differential detector to combine a wave derived from said derived carrier wave with said reference wave to produce a controlling voltage whose magnitude and polarity are determined by the vector sum or difference of the combined waves, a reactance tube having its output impedance connected to control the frequency generated by said first oscillator and having at least one grid, means including a low-pass filter for applying a biasing voltage derived from said controlling voltage to a grid of said reactance tube, a condenser adapted to have a charge applied thereto, means to prevent rapid discharge of said condenser, a relay responsive to the polarity and magnitude of said last mentioned voltage adapted to increase or decrease the charge of said condenser accordingly, but only while the magnitude of said last-mentioned voltage exceeds a predetermined magnitude, and means to apply to said grid a biasing voltage determined by the charge of said condenser, whereby the reactance of said tube will be determined by the combined effect of said biasing voltages and the frequency of said first oscillator will be adjusted accordingly.

9. A radio system including receiving means to receive a carrier and associated side bands transmitted from a distant station, an oscillator to produce a locally generated wave to beat with received frequencies, apparatus to maintain said locally generated wave in a desired frequency relationship with respect to the received carrier, said apparatus including means to produce a controlling voltage whose magnitude and polarity are determined by the variation of the frequency of said carrier with respect to a reference frequency, said means including a balanced detector circuit, a reactance tube connected to control the frequency generated by said oscillator, a biasing grid to control the value of the reactance of said tube, means including a low-pass filter to apply to said grid a biasing voltage derived from said controlling voltage, a condenser adapted to have a charge applied thereto, means to prevent rapid discharge of said condenser, a relay responsive to changes in the direction and value of said controlling voltage to increase or decrease the charge on said condenser accordingly, and means to apply to said grid a biasing voltage determined by the charge of said condenser, whereby the reactance of said tube will be determined by the combined effect of said biasing voltages, and the frequency of said oscillator will be adjusted accordingly.

CHARLES EARL WEAVER.

REFERENCES CITED

The following references are of record in the file of this patent:

UNITED STATES PATENTS

| Number | Name | Date |
|---|---|---|
| 2,245,710 | Rado | June 17, 1941 |
| 2,266,517 | Rust et al. | Dec. 16, 1941 |
| 2,396,688 | Crosby | Mar. 18, 1946 |
| 2,400,648 | Korman | May 21, 1946 |